United States Patent [19]

Andersen

[11] Patent Number: 4,561,504
[45] Date of Patent: Dec. 31, 1985

[54] FLEXIBLE TINE HARROW FOR THE PREPARATION OF SEED BEDS

[75] Inventor: Helge H. Andersen, Soro, Denmark

[73] Assignee: Kongskilde Koncernselskab A/S, Soro, Denmark

[21] Appl. No.: 602,334

[22] Filed: Apr. 20, 1984

[30] Foreign Application Priority Data

Apr. 26, 1983 [DK] Denmark ............................. 1850/83

[51] Int. Cl.[4] ...................... A01B 63/22; A01B 63/32
[52] U.S. Cl. ..................................... 172/142; 172/483
[58] Field of Search ............... 172/148, 149, 142, 484, 172/483, 491, 464

[56] References Cited

U.S. PATENT DOCUMENTS

| | | | |
|---|---|---|---|
| 641,030 | 1/1900 | Murry | 172/484 |
| 2,969,119 | 1/1961 | Barry | 172/464 |
| 3,126,689 | 3/1964 | Walker | 172/491 |
| 3,155,168 | 11/1964 | Telecky | 172/484 |
| 3,299,965 | 1/1967 | Sokolik | 172/142 |
| 4,479,549 | 10/1984 | Fegley | 172/142 |

OTHER PUBLICATIONS

Glencoe Danish Shank Field Cultivator with Double Rolling Baskets-Advertising Brochure of Glencoe Corp., Bloomington, IL, 9/1978.
Soil Preparation with the Triple K System, Advertising Brochure of Kongskilde Limited, Exeter, Ontario, Canada, 9/1978.

*Primary Examiner*—Richard J. Johnson
*Attorney, Agent, or Firm*—Anthony A. O'Brien

[57] ABSTRACT

In a flexible tine harrow for the preparation of seed beds and comprising a plurality of individual harrow sections, each of these sections has an intermediate frame which is supported by earth crumbling drums in front of and behind the harrow section and is towingly connected with the main frame both through a link connection at the front end of the intermediate frame and through a telescopic stay biased to extension and arranged above the harrow section, the directions of the pull and push forces exerted through the link connection and the stay intersecting at a point approximately in the level of the shares of the harrow tines.

2 Claims, 2 Drawing Figures

FLEXIBLE TINE HARROW FOR THE PREPARATION OF SEED BEDS

FIELD AND BACKGROUND OF THE INVENTION

It has long been known that a careful preparation of the field is essential to the conditions of growth of various crops and consequently to the obtainable yield and, therefore, a final harrowing and smoothing of the soil surface is frequently effected immediately before seeding for which purpose special flexible tine harrows and so-called rotacrats (crumbler drums) have been developed which should leave the soil surface as smooth as possible and without bigger clods. In this respect it is important that only a superficial layer of suitable depth is being worked by the harrow tines, and not less important is that the depth of processing is as constant as possible so as to obtain also an accurate sowing depth by the following mechanical sowing.

The purpose of the present invention is to provide an implement which in the best way fulfils these conditions.

More particularly, the invention relates to a seed bed preparing flexible tine harrow of the type comprising a main frame to be coupled to a tractor and in which a plurality of harrow sections are individually suspended, each harrow section comprising a set of harrow tines clamped in a tine frame which is adjustably suspended in an intermediate frame towingly connected with the main frame and having wheels or drums rolling on the soil surface.

Such harrows are known in which the intermediate frame solely by its own weight and the weight of the harrow tines and their frame rests on the wheels or drums which may be adjustable in relation to the intermediate frame, the towing connection from the main frame to the intermediate frame (and possibly also the suspension of the tine frame therein) being established by means of chains. Dependent on soil conditions such a seed bed harrow can yield a satisfactory working, but in several cases variations in the resistance to the harrow tines and in the bearing capacity of the soil surface will cause the tine frame to tilt or pitch which makes it impossible to fulfil the requirement of a constant harrowing depth.

SUMMARY OF THE NOVEL FEATURES OF THE INVENTION

As distinct from the prior embodiment it applies to the harrow according to the invention that each intermediate frame is connected with the main frame through a front link and a rear telescopic stay biased to extension, respectively, and that the link and the stay hinged to the intermediate frame are directed forwards/upwards and backwards/upwards, respectively, under such angles that their longitudinal directions intersect approximately in the level of the shares of the harrow tines.

During operation the intermediate frame suspended in this particular manner will be subjected both to a pull from the link and to a push from the stay. These pull and push forces may each be broken down in a horizontal, forwardly directed component and a vertical component directed upwardly and downwardly, respectively, and by an appropriate biasing of the telescopic stay it can be ensured that the vertical components neutralize each other when the force directions intersect in the said manner. The resulting force on the set of harrow tines will then become parallel to the soil surface and will be effective mainly in the same plane as the resistance that the share of the harrow tines must overcome and, consequently, variations in this resistance will not result in a moment of force capable of provoking a tilting or pitching movement as mentioned above.

DETAILED DESCRIPTION OF THE PREFERRED EMBODIMENT

Figure 1:
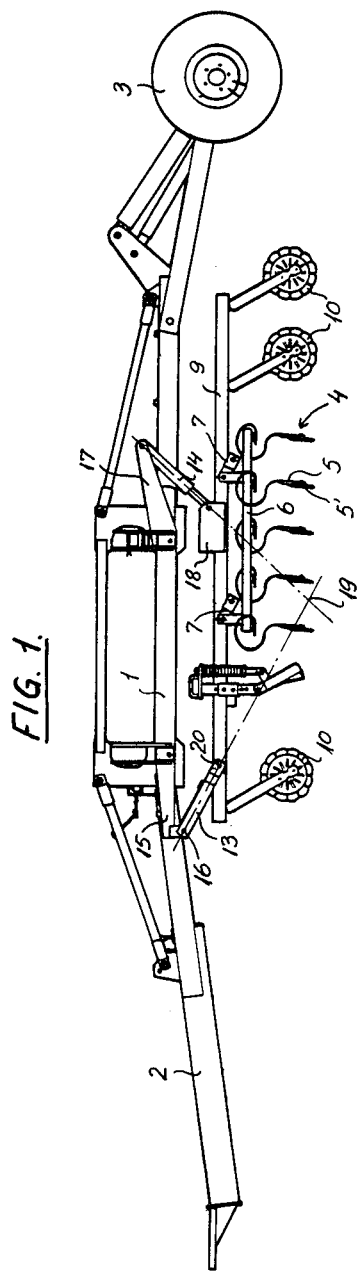
Figure 2:
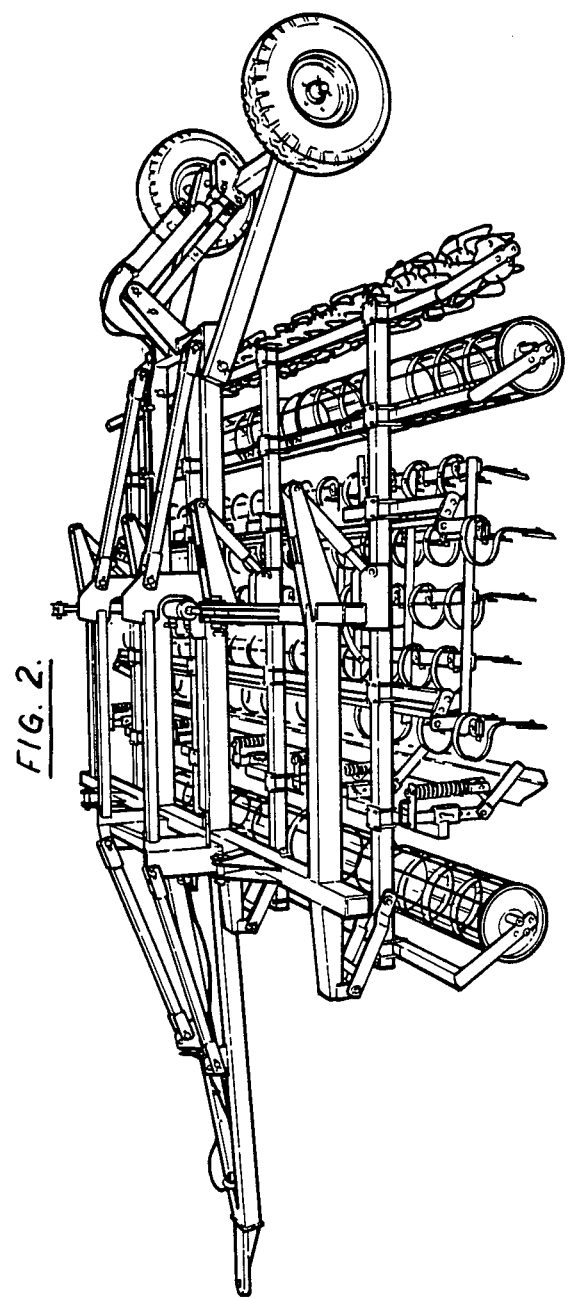

A preferred embodiment of the flexible tine harrow according to the invention is illustrated on the drawing in which FIG. 1 is a side elevational view, and FIG. 2 is a perspective view of FIG. 1.

The illustrated harrow comprises a main frame 1 which through a pull rod or hitch 2 can be coupled to a tractor and which at its rearmost end is provided with transport wheels 3, illustrated in their raised, inoperative position. The implement may as well be adapted to be suspended on the tractor so that the transport wheels become superfluous, and the main frame 1 may in an ordinary manner be composed of a centre section and a pair of side or wing sections which may be folded over the main section when the implement is to be transported on public roads.

A number of individual harrow sections 4, of which only one is seen in FIG. 1 of the drawing, are suspended side-by-side in the main frame 1. Each of said sections comprises a set of harrow tines 5 having shares 5' and being clamped in a tine frame 6, which through a pair of ordinary height adjusting mechanisms 7 or levers 8 is suspended in an intermediate frame 9. Both in front of and behind the harrow section 4 said intermediate frame is provided with one or more drums, for instance so-called crumblers or rotacrats 10 which determine the height of the intermediate frame 9 above the soil surface on which the drums are rolling. Said height too may be adjustable.

To transmit the pull force from the main frame 1 to each intermediate frame 9 and thus to the harrow section 4 there are provided, on the one hand, a link connection 13 at the front end of the intermediate frame and, on the other hand, a telescopic stay 14 above the harrow section 4. The link or lever 13 of the link connection is hinged to a mounting plate 15 on the main frame 1 and to the intermediate frame 9, its hinge point 16 on the mounting 15 being positioned ahead of its hinge point 20 on the intermediate frame 9. The stay 14 may appropriately be constituted by a hydraulic cylinder biased to extension, which in a manner known per se and not illustrated on the drawings is hydraulically connected with the corresponding cylinders associated with the other harrow sections and the upper end of which is supported by a mounting plate 17 from which the stay is directed forwards/downwards to a mounting fitting 18 on the intermediate frame 9.

As illustrated in dotted lines, the longitudinal directions of the link 13 and the stay 14 intersect in a point 19 which is not level with the shares of the harrow tines 5, and the pull and push forces transmitted through the link and the stay may, therefore, as explained above, be combined into a horizontal resultant in the intersection point 19.

The hydraulic series connection of the cylinders of the stays 14 is intended, as is the case with analogous arrangements in prior harrows, to ensure uniform working depth of the harrow tines associated with the various intermediate frames even though the field is not in a plane transversely to the driving direction of the harrow.

I claim:

1. A flexible tine harrow for seed bed preparation, comprising a main frame with hitch means for coupling to a tractor, a plurality of intermediate frames suspended beneath main frame and each provided with earth engaging roller means, a harrow tine frame associated with each of said intermediate frames and adjustably suspended therefrom, and a set of harrow tines clamped in each of said harrow tine frames and having shares lying in the same level, each of said intermediate frames being connected with said main frame through a front link and a rear adjustable telescopic stay biased to extension, respectively, said link and said stay being hingedly connected to said intermediate frame and extending, respectively, from their hinge points under such angles that their longitudinal centerlines intersect approximately in the level of said shares.

2. A flexible tine harrow as claimed in claim 1, wherein each of said telescopic stays of the intermediate frames includes a hydraulic cylinder, the various hydraulic cylinders being coupled in series with each other.

* * * * *